US012263741B2

(12) United States Patent
Nakashima

(10) Patent No.: US 12,263,741 B2
(45) Date of Patent: Apr. 1, 2025

(54) IN-VEHICLE POWER SUPPLY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Arata Nakashima, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/254,721

(22) PCT Filed: Nov. 16, 2021

(86) PCT No.: PCT/JP2021/041986
§ 371 (c)(1),
(2) Date: May 26, 2023

(87) PCT Pub. No.: WO2022/124020
PCT Pub. Date: Jun. 16, 2022

(65) Prior Publication Data
US 2024/0300340 A1    Sep. 12, 2024

(30) Foreign Application Priority Data
Dec. 7, 2020 (JP) .................. 2020-202378

(51) Int. Cl.
*B60L 50/64*     (2019.01)
*H02M 1/36*      (2007.01)
*H02M 3/158*     (2006.01)

(52) U.S. Cl.
CPC ............... *B60L 50/64* (2019.02); *H02M 1/36* (2013.01); *H02M 3/158* (2013.01); *B60L 2210/10* (2013.01)

(58) Field of Classification Search
CPC ...... B60L 50/64; B60L 2210/10; H02M 1/36; H02M 3/158; H02M 3/155; H02M 3/1582
(Continued)

(56) References Cited

U.S. PATENT DOCUMENTS

2011/0006743 A1   1/2011  Fabbro
2015/0311797 A1   10/2015 Okamatsu et al.
(Continued)

FOREIGN PATENT DOCUMENTS

JP   2012-170304 A    9/2012
JP   2014131443 A  *  7/2014
(Continued)

OTHER PUBLICATIONS

JP2014131443.Translation (Year: 2014).*

*Primary Examiner* — Elim Ortiz
(74) *Attorney, Agent, or Firm* — Honigman LLP

(57) ABSTRACT

An in-vehicle power supply device includes a voltage conversion unit and a control unit. The control unit performs first control to cause the voltage conversion unit to perform only a step-down operation, second control to cause the voltage conversion unit to perform only a step-up operation, and third control to cause the voltage conversion unit to perform both the step-down operation and the step-up operation. The control unit performs the third control if a first duty of an on-off signal provided to a first switching element becomes an upper limit threshold or greater in the first
(Continued)

control or if a second duty of an on-off signal provided to a second switching element becomes a lower limit threshold or less in the second control.

4 Claims, 5 Drawing Sheets

(58) Field of Classification Search
USPC ....... 323/271, 282, 222, 224, 272, 284, 225, 323/285; 307/6, 45, 58, 82
See application file for complete search history.

(56) References Cited

U.S. PATENT DOCUMENTS

| | | |
|---|---|---|
| 2016/0134190 A1 | 5/2016 | Nishimura |
| 2018/0254732 A1* | 9/2018 | Smolenaers ............. H02J 1/12 |
| 2019/0280595 A1 | 9/2019 | Yabuta et al. |
| 2020/0076304 A1 | 3/2020 | Oyama |

FOREIGN PATENT DOCUMENTS

| | | |
|---|---|---|
| JP | 2016-167896 A | 9/2016 |
| JP | 2017-143653 A | 8/2017 |

\* cited by examiner

IN-VEHICLE POWER SUPPLY DEVICE

CROSS-REFERENCE TO RELATED APPLICATIONS

This application is the U.S. national stage of PCT/JP2021/041986 filed on Nov. 16, 2021, which claims priority of Japanese Patent Application No. JP 2020-202378 filed on Dec. 7, 2020, the contents of which are incorporated herein.

TECHNICAL FIELD

The present disclosure relates to an in-vehicle power supply device.

BACKGROUND

JP 2014-222969A discloses a voltage conversion device that includes a step-down switching element and a step-up switching element between which switching takes place under PWM control, and outputs an input voltage having undergone step-down conversion or step-up conversion. The voltage conversion device gradually increases the duty of a step-down PWM signal to reach 100% in the step-down conversion.

In some configurations, however, when the duty of the step-down PWM signal approaches 100%, normal switching can no longer be performed. For example, if the step-down switching element is an N-channel FET, it is necessary to increase the gate voltage to be higher than the source voltage in order to turn on the step-down switching element. Thus, it is conceivable for the gate voltage to be increased to be higher than the source voltage by a boot strap circuit. In this configuration, however, when the duty ratio of the step-down PWM signal approaches 100%, the charging of the capacitor of the boot strap circuit may become insufficient, and the step-down switching element may not be normally turned on. In this case, appropriate voltage conversion cannot be performed.

Thus, an object of the present disclosure is to provide a technique for suppressing the occurrence of a situation in which appropriate voltage conversion cannot be performed.

SUMMARY

An in-vehicle power supply device of the present disclosure is an in-vehicle power supply device including: a voltage conversion unit configured to perform voltage conversion between a first conducting path and a second conducting path; and a control unit configured to control the voltage conversion unit, wherein the voltage conversion unit has a first switching element and a second switching element, and performs a step-down operation of turning on and off the first switching element to decrease a voltage applied to the first conducting path and applying the voltage to the second conducting path, and a step-up operation of turning on and off the second switching element to increase a voltage applied to the first conducting path and applying the voltage to the second conducting path, the control unit performs first control to cause the voltage conversion unit to perform the step-down operation and not perform the step-up operation, second control to cause the voltage conversion unit to perform the step-up operation and not perform the step-down operation, and third control to cause the voltage conversion unit to perform both the step-down operation and the step-up operation, and the control unit performs the third control in a case where a first duty of an on-off signal provided to the first switching element becomes an upper limit threshold or greater in the first control, and in a case where a second duty of an on-off signal provided to the second switching element becomes a lower limit threshold or less in the second control.

Advantageous Effects

According to the present disclosure, it is possible to suppress the occurrence of a situation in which appropriate voltage conversion cannot be performed.

DETAILED DESCRIPTION OF PREFERRED EMBODIMENTS

Figure 1:
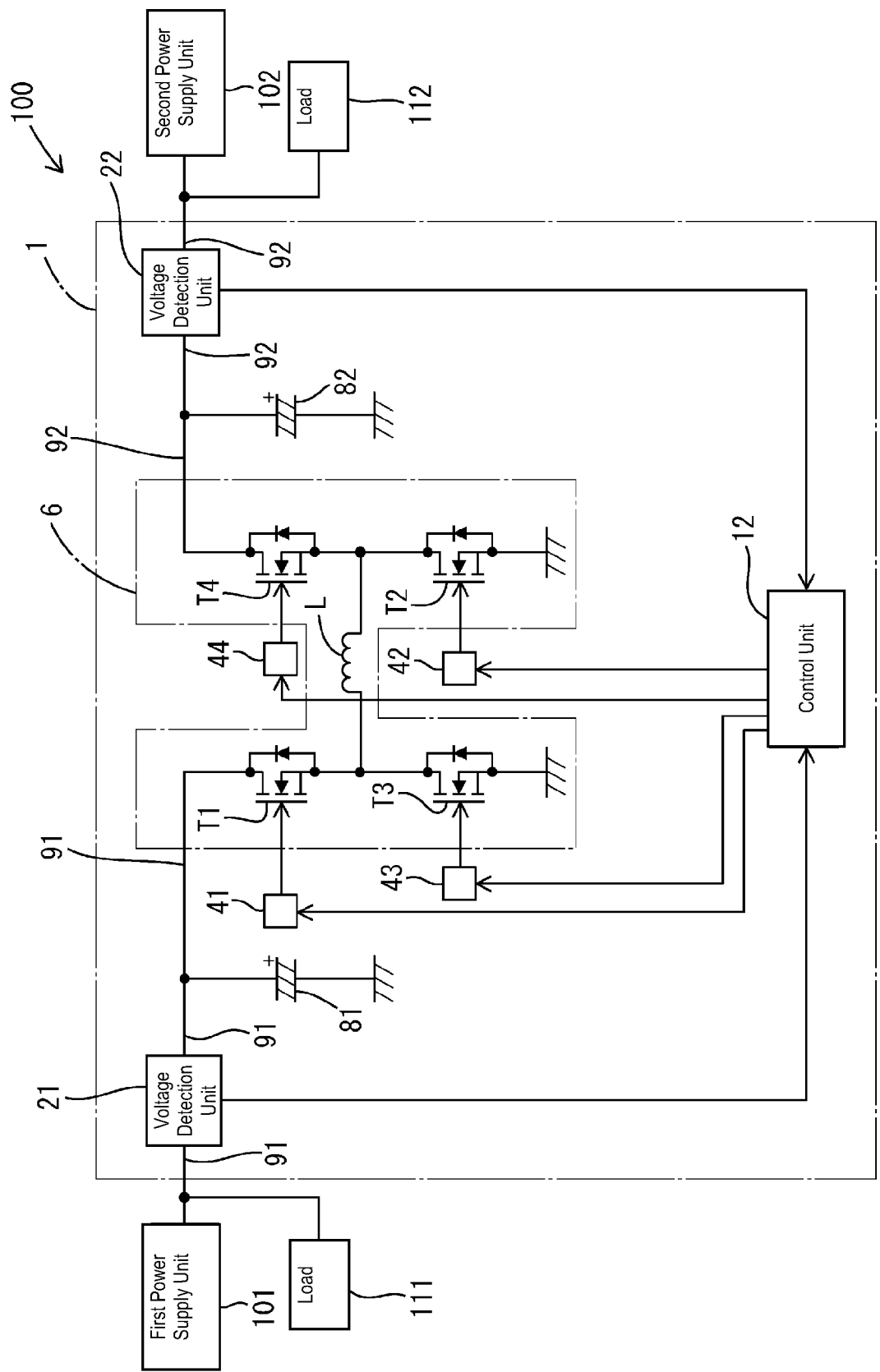
FIG. 1 is a circuit diagram schematically showing a configuration of an in-vehicle power supply system in a first embodiment.

First, embodiments of the present disclosure will be listed and described.

An in-vehicle power supply device including: a voltage conversion unit configured to perform voltage conversion between a first conducting path and a second conducting path; and a control unit configured to control the voltage conversion unit, wherein the voltage conversion unit has a first switching element and a second switching element, and performs a step-down operation of turning on and off the first switching element to decrease a voltage applied to the first conducting path and applying the voltage to the second conducting path, and a step-up operation of turning on and off the second switching element to increase a voltage applied to the first conducting path and applying the voltage to the second conducting path, the control unit performs first control to cause the voltage conversion unit to perform the step-down operation and not perform the step-up operation, second control to cause the voltage conversion unit to perform the step-up operation and not perform the step-down operation, and third control to cause the voltage conversion unit to perform both the step-down operation and the step-up operation, and the control unit performs the third control in a case where a first duty of an on-off signal provided to the first switching element becomes an upper limit threshold or greater in the first control, and in a case where a second duty of an on-off signal provided to the second switching element becomes a lower limit threshold or less in the second control.

According to this configuration, in the first control, only the step-down operation is performed until the first duty becomes the upper limit threshold or greater, thus suppressing power consumption, and when the first duty becomes the upper limit threshold or greater, the third control is performed to realize voltage conversion that would be difficult by only performing the step-down operation. In addition, according to this configuration, in the second control, only the step-up operation is performed until the second duty becomes the lower limit threshold or less, thus suppressing power consumption, and when the second duty becomes the lower limit threshold or less, the third control is performed to realize voltage conversion that would be difficult by only performing the step-up operation. Therefore, it is possible to suppress the occurrence of a situation in which appropriate voltage conversion cannot be performed, while suppressing power consumption.

The in-vehicle power supply device according to (1), wherein the control unit performs increase control to gradually increase the first duty in the first control at a transition from the first control to the second control, and, when the first duty reaches the upper limit threshold in the increase control, the control unit switches to the third control, and then performs the second control after the third control.

According to this configuration, it is possible to suppress the occurrence of a situation in which appropriate voltage conversion cannot be performed in the course of transition from the step-down operation to the step-up operation.

The in-vehicle power supply device according to (1) or (2), wherein the control unit performs decrease control to gradually decrease the second duty at a transition from the second control to the first control, and, when the second duty reaches the lower limit threshold in the decrease control, the control unit switches to the third control, and then performs the first control after the third control.

According to this configuration, it is possible to suppress the occurrence of a situation in which appropriate voltage conversion cannot be performed in the course of transition from the step-up operation to the step-down operation.

The in-vehicle power supply device according to any one of (1) to (3), wherein at the time of switching from the first control or the second control to the third control, the control unit adjusts the first duty and the second duty such that a voltage conversion rate is identical before and after the switching.

According to this configuration, it is possible to suppress the output voltage from changing a large amount when switching from the first control or the second control to the third control.

First Embodiment

Configuration of In-Vehicle Power Supply System

An in-vehicle power supply system 100 shown in FIG. 1 includes an in-vehicle power supply device 1, a first power supply unit 101, and a second power supply unit 102, and is configured as a system that can supply power to in-vehicle loads such as loads 111 and 112.

The in-vehicle power supply device 1 is configured as an in-vehicle step-up/step-down DCDC converter, for example, and steps up or steps down a direct-current voltage applied to either a first conducting path 91 or a second conducting path 92, and outputs the voltage to the other conducting path.

The in-vehicle power supply device 1 includes the first conducting path 91 and the second conducting path 92 as power lines. The first conducting path 91 is a wiring line that is electrically connected to a high-potential terminal of the first power supply unit 101 serving as a high-voltage power supply unit and conducts electricity to the high-potential terminal, and receives application of a predetermined direct current voltage from the first power supply unit 101. The second conducting path 92 is a wiring line that is electrically connected to a low-potential terminal of the second power supply unit 102 serving as a high-voltage power supply unit and conducts electricity to the high-potential terminal, and receives application of a predetermined direct current voltage from the second power supply unit 102.

The first power supply unit 101 and the second power supply unit 102 are constituted by known power storage means such as lead storage batteries, lithium-ion batteries, electric-double-layer capacitors, lithium-ion capacitors, or other power storage units, for example. The output voltage of the first power supply unit 101 is higher than the output voltage of the second power supply unit 102, and there are no particular limitations on the specific values of the output voltages. The low-potential terminals of the first power supply unit 101 and second power supply unit 102 are electrically connected to a ground not illustrated and kept at a predetermined ground potential (0 V).

The load 111 is electrically connected to the first conducting path 91, which is electrically connected to the first power supply unit 101, and the load 111 receives power supply from the first power supply unit 101. The load 112 is electrically connected to the second conducting path 92, which is electrically connected to the second power supply unit 102, and the load 112 receives power supply from the second power supply unit 102. The loads 111 and 112 are known in-vehicle electrical components and are not particularly limited in terms of type.

The in-vehicle power supply device 1 includes a voltage conversion unit 6, voltage detection units 21 and 22, a control unit 12, drive circuits 41, 42, 43, and 44, and capacitors 81 and 82.

The voltage conversion unit 6 performs voltage conversion between the first conducting path 91 and the second conducting path 92. The voltage conversion unit 6 has a first switching element T1, a second switching element T2, a third switching element T3, a fourth switching element T4, (hereinafter, also called switching elements T1, T2, T3, and T4), and an inductor L. The switching elements T1, T2, T3, and T4 are configured as N-channel MOSFETs, for example. The switching elements T1, T2, T3, and T4 are arranged in an H bridge structure. The switching elements T1, T2, T3, and T4 turn on and off upon receiving on-off signals. The on-off signal is a pulse width modulation (PWM) signal, for example. The inductor L is configured as a known coil. The voltage conversion unit 6 functions as a bidirectional DCDC converter.

The first switching element T1 and the third switching element T3 are connected in series between the first conducting path 91 and the ground. The drain of the first switching element T1 is electrically connected to the first conducting path 91. The source of the first switching element T1 is electrically connected to the drain of the third switching element T3 and one end of the inductor L. The source of the third switching element T3 is electrically connected to the ground.

The fourth switching element T4 and the second switching element T2 are connected in series between the second conducting path 92 and the ground. The drain of the fourth switching element T4 is electrically connected to the second conducting path 92. The source of the fourth switching element T4 is electrically connected to the drain of the second switching element T2 and the other end of the inductor L. The source of the second switching element T2 is electrically connected to the ground.

One end of the capacitor 81 is electrically connected to the first conducting path 91, and the other end of the capacitor 81 is electrically connected to the ground. One end of the capacitor 82 is electrically connected to the second conducting path 92, and the other end of the capacitor 82 is electrically connected to the ground.

The voltage conversion unit 6 performs a step-down operation of turning on and off the first switching element T1 to step down the voltage applied to the first conducting path 91, and applying the resulting voltage to the second conducting path 92. The voltage conversion unit 6 also performs a step-up operation of turning on and off the second switching element T2 to step up the voltage applied to the first conducting path 91, and applying the resulting voltage to the second conducting path 92.

The voltage detection units 21 and 22 are configured as known voltage detection circuits, for example. The voltage detection unit 21 detects the voltage of the first conducting path 91. The voltage detection unit 22 detects the voltage of the second conducting path 92.

The control unit 12 is configured as a microcomputer, for example, and includes a CPU, a ROM, a RAM, a non-volatile memory, and others. The voltage detection units 21 and 22 are electrically connected to the control unit 12, and input signals indicating voltages detected by the voltage detection units 21 and 22 to the control unit 12.

The control unit 12 is electrically connected to the voltage conversion unit 6 via the drive circuits 41, 42, 43, and 44, and causes the voltage conversion unit 6 to perform the step-down operation and the step-up operation. When causing the voltage conversion unit 6 to perform the step-down operation and the step-up operation, the control unit 12 performs feedback control such that the voltage of the second conducting path 92 approaches a target voltage value. The feedback control is PI control, PID control, or the like, for example. The target voltage value may be a value set by the control unit 12 or may be a value specified by an external device such as an external electronic control unit (ECU).

Specifically, the control unit 12 performs a known feedback arithmetic operation such as a PID arithmetic operation or a PI arithmetic operation, based on the difference between the voltage of the second conducting path 92 and the target voltage value, thereby determining the duty of an on-off signal such that the voltage of the second conducting path 92 approaches the target voltage value. The duty is the ratio of the on time to the switching period. The control unit 12 periodically updates the duty by periodically performing the feedback arithmetic operation. The duty includes a first duty for controlling the on and off state of the first switching element T1 and a second duty for step-up for controlling the on and off state of the second switching element T2.

In the case of causing the voltage conversion unit 6 to perform the step-down operation, the control unit 12 determines the first duty and provides the on-off signal having the determined first duty to the drive circuits 41 and 43. Upon receiving the on-off signal from the control unit 12, the drive circuit 41 outputs an on-off signal having the same period and same duty as the provided on-off signal to the gate of the first switching element T1. Upon receiving the on-off signal from the control unit 12, the drive circuit 43 reverses the on/off state and outputs, to the gate of the third switching element T3, an on-off signal that is complementary to the on-off signal that was output by the drive circuit 41 to the gate of the first switching element T1. Accordingly, synchronous rectification control is performed during the step-down operation.

In the case of causing the voltage conversion unit 6 to perform the step-up operation, the control unit 12 determines the second duty and provides the on-off signal having the determined second duty to the drive circuits 42 and 44. Upon receiving the on-off signal from the control unit 12, the drive circuit 42 outputs an on-off signal having the same period and same duty as the provided on-off signal to the gate of the second switching element T2. Upon receiving the on-off signal from the control unit 12, the drive circuit 44 inverts the on/off state and outputs, to the gate of the fourth switching element T4, an on-off signal that is complementary to the on-off signal that was output by the drive circuit 42 to the gate of the second switching element T2. Accordingly, synchronous rectification control is performed during the step-up operation.

The drive circuits 41 and 44, which control the high-side switching elements T1 and T4, each have a boot strap circuit not shown, for example. When providing on signals to the gates of the switching elements T1 and T4, the drive circuits 41 and 44 apply voltages made higher than the source voltages of the first switching element T1 and T4 by the boot strap circuits, to the gates of the switching elements T1 and T4. In the present embodiment, the on signal is a high-level signal, and the off signal is a low-level signal.

The control unit 12 performs first control to cause the voltage conversion unit 6 to perform only the step-down operation, second control to cause the voltage conversion unit 6 to perform only the step-up operation, and third control to cause the voltage conversion unit 6 to perform both the step-down operation and the step-up operation. If the first duty becomes the upper limit threshold or greater during the first control, the control unit 12 performs the third control. If the second duty becomes the lower limit threshold or less during the second control, the control unit 12 performs the third control. In the present embodiment, the upper limit threshold is a value smaller than the upper limit value, but may be the same as the upper limit value. In the present embodiment, the lower limit threshold is a value greater than the lower limit value, but may be the same as the lower limit value.

The following describes the upper limit value and the lower limit value. As stated above, the drive circuits 41 and 44 apply voltages increased by the boot strap circuits to the gates of the switching element T1 and T4. Accordingly, when the duties of the on-off signals generated by the drive circuits 41 and 44 approach 100%, the off time becomes short and the charging of the capacitors included in the boot strap circuits becomes insufficient. As a result, the drive circuits 41 and 44 may not be able to cause the first switching elements T1 and T4 to switch on. Thus, the upper limit value is set to the first duty for controlling the on and off state of the first switching element T1. In addition, during the step-up operation, if the fourth switching element T4 is not switched on, the on-off control cannot be performed by the synchronous rectification method. Thus, the lower limit value is set in a range in which synchronous rectification is possible, that is to say a value obtained by subtracting the upper limit value from 100%, for the second duty for controlling the on and off state of the second switching element T2. The upper limit value, the lower limit value, the upper limit threshold, and the lower limit threshold are stored in advance in the control unit 12. In the present embodiment, the upper limit value is 97%, the lower limit value is 3%, the upper limit threshold is 95%, and the lower limit threshold is 5%.

At the time of transition from the first control to the second control, the control unit 12 performs increase control to gradually increase the first duty of the on-off signal to be provided to the first switching element T1 in the first control. When the first duty reaches the upper limit threshold in the increase control, the control unit 12 switches to the third control, and then performs the second control after the third control.

At the time of transition from the second control to the first control, the control unit 12 performs decrease control to gradually decrease the second duty of the on-off signal to be provided to the second switching element T2 in the second control. When the second duty reaches the lower limit threshold in the decrease control, the control unit 12 switches to the third control, and then performs the first control after the third control.

At the time of switching from the first control to the third control, the control unit 12 adjusts the first duty and the second duty such that the voltage conversion rate is identical before and after the switching. During the switching from the second control to the third control, the control unit 12 adjusts the first duty and the second duty such that the voltage conversion rate is identical before and after the switching. The "voltage conversion ratio" refers to the ratio of the output voltage to the input voltage. The case where "the voltage conversion ratio is identical" includes not only the case where the voltage conversion ratio is completely identical but also the case where the voltage conversion ratio is substantially identical. The case where "the voltage conversion ratio is completely identical" means the case where the difference in the voltage conversion ratio before and after the switching is a predetermined minor difference or lower, for example.

Processing for Transitioning from First Control to Second Control

Next, a flow of transition from the first control to the second control will be described with reference to FIG. 2. If the start switch (for example, the ignition switch) of the vehicle is turned on, for example, the control unit 12 starts the processing illustrated in FIG. 2. The control unit 12 can detect the on/off state of the start switch of the vehicle by receiving a signal indicating the on/off state of the vehicle from an external ECU (Electronic Control Unit), for example.

Figure 2:
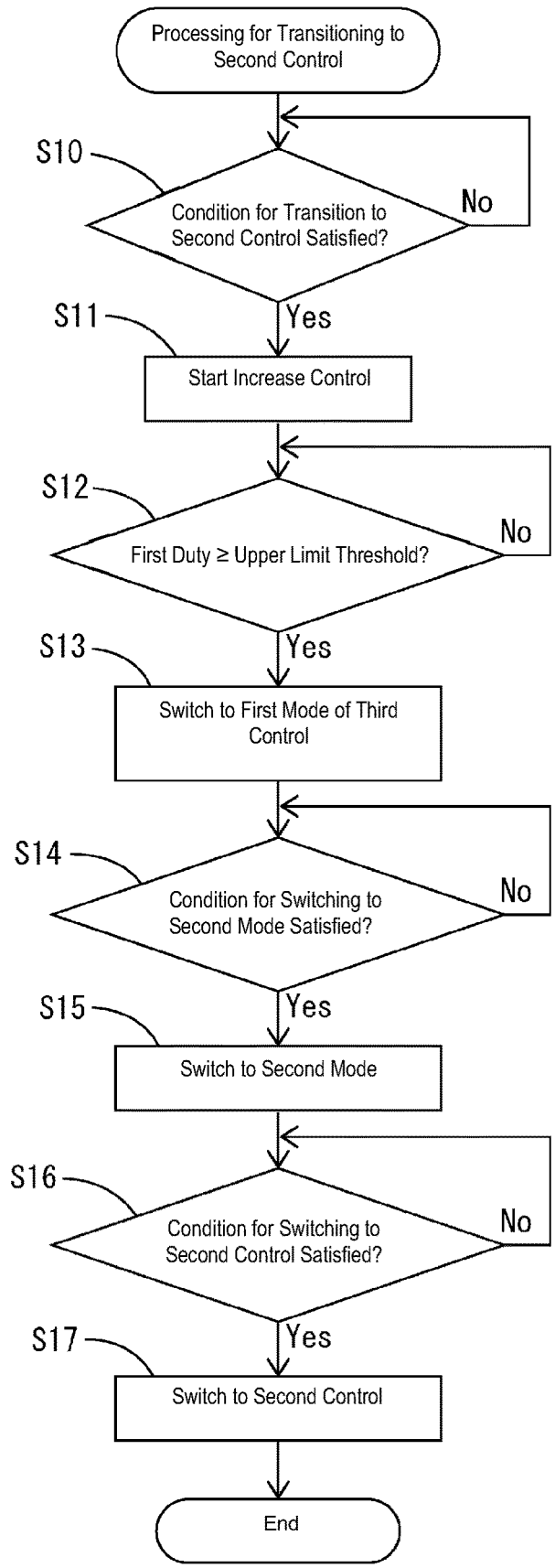
FIG. 2 is a flowchart of processing for transitioning from first control to second control.

When starting the processing illustrated in FIG. 2, the control unit 12 determines whether a condition for transition to the second control is satisfied (step S10). The "condition for transition to the second control" may be that "the start switch of the vehicle has been turned on", "detection values from various sensors have exceeded predetermined values", or "a predetermined operation has been performed by the user", for example. If the condition for transition to the second control is not satisfied (No in step S10), the control unit 12 returns to step S10. That is, the control unit 12 repeats the determination of whether the condition for transition to the second control is satisfied, until the condition for transition to the second control is satisfied. In the state before the condition for transition to the second control is satisfied, the control unit 12 performs the first control or does not perform any of the first control, the second control, and the third control.

If the condition for transition to the second control is satisfied (Yes in step S10), the control unit 12 starts the increase control (step S11). For example, if the control unit 12 has already performed the first control, the control unit 12 gradually increases the first duty while fixing the second duty at 0% in the first control that is being executed. If the control unit 12 does not perform the first control, the control unit 12 starts the first control and gradually increases the first duty while fixing the second duty at 0%. Accordingly, the output voltage of the voltage conversion unit 6 gradually increases.

After starting the increase control, the control unit 12 determines whether the first duty has become the upper limit threshold or greater (step S12). If the first duty has not become the upper limit threshold or greater (No in step S12), the control unit 12 returns to step S12. That is, the control unit 12 repeats the determination of whether the first duty has become the upper limit threshold or greater while continuing the increase control. If the first duty has become the upper limit threshold or greater (Yes in step S12), the control unit 12 switches to the third control (step S13). At this time, the control unit 12 adjusts the first duty and the second duty such that the voltage conversion ratio is identical before and after the switching.

An example of a method for adjusting the first duty and the second duty will be described below. The voltage conversion ratio is determined by the following Equation 1, where the voltage conversion ratio is TR (%), the first duty is D1(%), and the second duty is D2(%):

$$TR = D1 \times (100/(100 - D2)) \qquad \text{Equation (1)}$$

In the state before the switching, D2=0 and thus the TR immediately before the switching is determined by substituting the current value of D1 into Equation 1. For example, if D1=95, then TR=95. Thus, the voltage conversion ratio immediately before the switching is determined. That is, the first duty and the second duty immediately after the switching are D1 and D2 satisfying Equation 2, in which TR=95 is substituted into Equation 1 as follows:

$$95 = D1 \times (100/(100 - D2)) \qquad \text{Equation (2)}$$

For example, D1 is determined by substituting 3(%), which is the lower limit value of the second duty, for D2 in Equation 2. In this case, D1=92.15. That is, immediately after the switching, the first duty of the on-off signal provided to the first switching element T1 is 92.15%, and the third duty of the on-off signal provided to the third switching element T3 is 7.85%. The second duty of the on-off signal provided to the second switching element T2 is 3%, and the fourth duty of the on-off signal provided to the fourth switching element T4 is 97%.

At the time of switching from the first control to the third control, the control unit 12 switches to a first mode of the third control (step S13). The first mode of the third control is a mode for gradually increasing the first duty while fixing the second duty. After switching to the first mode of the third control, the control unit 12 determines whether a condition for switching to a second mode of the third control is satisfied (step S14). The "condition for switching to a second mode" may be that "the first duty has reached the upper limit value" or "the time elapsed since switching to the third control has reached a predetermined time". If the condition for switching to the second mode is not satisfied (No in step S14), the control unit 12 returns to step S14. That is, the control unit 12 repeats the determination of whether the condition for switching to the second mode is satisfied while continuing the first mode to gradually increase the first duty. If the condition for switching to the second mode is satisfied (Yes in step S14), the control unit 12 switches to the second mode of the third control (step S15). The second mode of the third control is a mode for increasing the second duty while fixing the first duty. The first duty and the second duty are both identical before and after the switching from the first mode to the second mode.

After switching to the second mode in step S15, the control unit 12 determines whether the condition for switching to the second control is satisfied (step S16). The "condition for switching to the second control" may be that "the second duty has become a step-up switching threshold or greater", "the voltage conversion ratio has become identical to the voltage conversion ratio at which the first duty is 100% and the second duty is equal to the lower limit threshold", or "the time elapsed since switching to the second mode has reached a predetermined time", for example.

If the condition for switching to the second control is not satisfied (No in step S16), the control unit 12 returns to step S16. That is, the control unit 12 repeats the determination of which the condition for switching to the second control is satisfied while continuing the second mode of the third control. If the condition for switching to the second control is satisfied (Yes in step S16), the control unit 12 switches to the second control (step S17). At the time of switching from the third control to the second control, the control unit 12 adjusts the first duty and the second duty such that the voltage conversion ratio is identical before and after the switching. As an adjustment method, first, the current voltage conversion ratio is calculated in accordance with Equation 1, for example. Then, D2 is determined by substituting the current voltage ratio for TR and substituting 100(%) for D1 in Equation 1. Accordingly, the post-switching second duty is determined. As another adjustment method, the control unit 12 may determine in advance the post-switching first duty and second duty, and switch to the second control at the timing when the current voltage conversion ratio becomes identical to the post-switching voltage conversion ratio in the third control. After switching to the second control, the control unit 12 gradually increases the second duty such that the output voltage of the voltage conversion unit 6 reaches the target voltage value while keeping the first duty at 100%.

Figure 3:
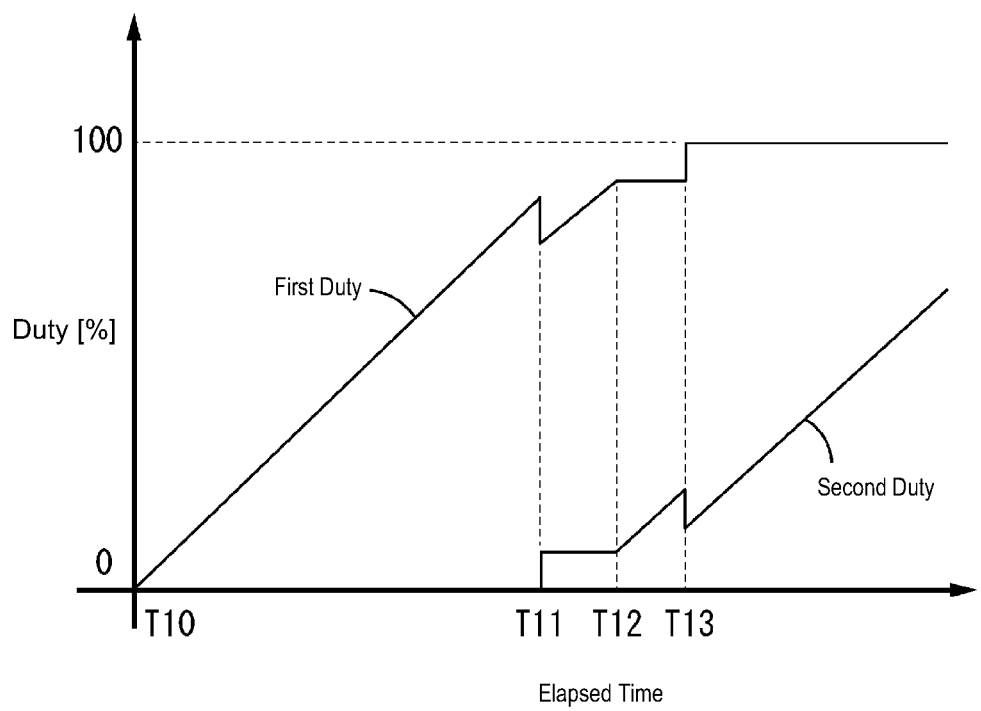
FIG. 3 is a graph showing temporal changes in a first duty and a second duty at the time of transition from the first control to the second control.

Next, temporal changes in the duty at the time of transition from the first control to the second control will be described. In the example of FIG. 3, the control unit 12 does not perform any of the first control, the second control, and the third control at the stage before timing T10. At timing T10, the control unit 12 starts the increase control in response to the satisfaction of the condition for transition to the second control. As a result, the first duty gradually increases and the output voltage from the voltage conversion unit 6 gradually increases. After that, at timing T11, the first duty reaches the upper limit threshold. Thus, the control unit 12 switches from the first control to the third control such that the voltage conversion ratio is identical before and after the switching. As a result, the first duty decreases so as to be lower than that immediately before the switching, and the second duty increases so as to be higher than that immediately before the switching. At timing T11, the control unit 12 switches from the first control to the first mode of the third control. Thus, the first duty alone gradually increases while the second duty is fixed. After that, at timing T12, if the condition for switching to the second mode is satisfied, the control unit 12 switches to the second mode. As a result, the second duty gradually increases while the first duty is fixed. Further, at timing T13, if the condition for switching to the second control is satisfied, the control unit 12 switches from the third control to the second control such that the voltage conversion ratio is identical before and after the switching.

At the time of switching, the first duty increases to 100%, and the second duty decreases to the lower limit threshold, for example. After that, the second duty gradually increases while the first duty is fixed at 100%.

Processing for Transitioning from Second Control to First Control

Next, a flow of transition from the second control to the first control will be described with reference to FIG. 4. The control unit 12 starts the processing described in FIG. 4 if a transition to the second control was performed through the above-described processing for transitioning from the first control to the second control, for example.

Figure 4:
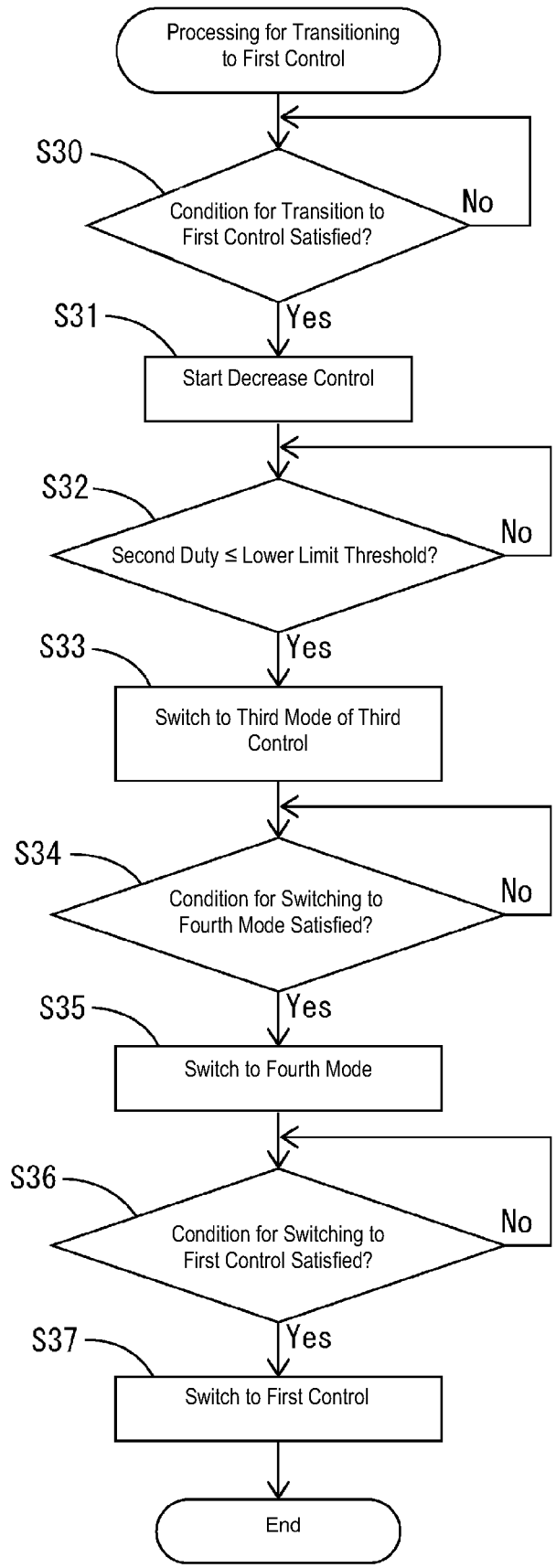
FIG. 4 is a flowchart of processing for transitioning from the second control to the first control.

When starting the processing described in FIG. 4, the control unit 12 determines whether a condition for transition to the first control is satisfied (step S30). The "condition for transition to the first control" may be that "the start switch of the vehicle has been turned off", "detection values from various sensors have exceeded a predetermined value", or "a predetermined operation has been performed by the user", for example. If the condition for transition to the first control is not satisfied (No in step S30), the control unit 12 returns to step S30. That is, the control unit 12 repeats the determination of whether the condition for transition to the first control is satisfied, until the condition for transition to the first control is satisfied. Before the condition for transition to the first control is satisfied, the control unit 12 performs the second control.

If the condition for transition to the first control is satisfied (Yes in step S30), the control unit 12 starts the decrease control (step S31). Specifically, the control unit 12 gradually decreases the second duty while fixing the first duty at 100% in the second control that is being executed. Accordingly, the output voltage of the voltage conversion unit 6 gradually decreases.

After starting the decrease control, the control unit 12 determines whether the second duty has become the lower limit threshold or less (step S32). If the second duty has not become the lower limit threshold or less (No in step S32), the control unit 12 returns to step S32. That is, the control unit 12 repeats the determination of whether the second duty has become the lower limit threshold or less while continuing the decrease control. If the second duty has become the lower limit threshold or less (Yes in step S32), the control unit 12 switches to the third control (step S33). At this time, the control unit 12 adjusts the first duty and the second duty such that the voltage conversion ratio is identical before and after the switching.

The first duty and second duty immediately after the switching to the third control are determined by using Equation 1 described above, for example. Specifically, first, the voltage conversion ratio immediately before the switching is calculated. Since D1=100 in the state before the switching, the current value of D2 is substituted into Equation 1 to determine the voltage conversion ratio immediately before the switching. If D2 is 5(%) in the state before the switching, for example, TR is about 105.26(%). That is, the voltage conversion ratio immediately before the switching is about 105.26%. The first duty and second duty immediately after the switching are D1 and D2 that satisfy Equation 2 in which 105.26(%) is substituted for TR in Equation 1 as follows:

$$105.26 = D1 \times (100/(100 - D2)) \quad \text{Equation (3)}$$

D2 is determined by substituting 97%, which is the upper limit value of the first duty, for D1 in Equation 3, for example. In this case, D2 is about 7.85(%). That is, immediately after the switching, the first duty of the on-off signal provided to the first switching element T1 is 97%, and the third duty of the on-off signal provided to the third switching element T3 is 3%. The second duty of the on-off signal provided to the second switching element T2 is 7.85%, and the fourth duty of the on-off signal provided to the fourth switching element T4 is 92.15%.

At the time of switching from the second control to the third control, the control unit 12 switches to a third mode of the third control (step S33). The third mode of the third control is a mode for gradually decreasing the second duty while fixing the first duty. After switching to the third mode of the third control, the control unit 12 determines whether a condition for switching to a fourth mode of the third control is satisfied (step S34). The "condition for switching to the fourth mode" may be that "the second duty has reached the lower limit value" or "the time elapsed since the switching to the third control has reached a predetermined time", for example. If the condition for switching to the fourth mode is not satisfied (No in step S34), the control unit 12 returns to step S34. That is, the control unit 12 repeats the determination of whether the condition for switching to the fourth mode is satisfied while continuing the third mode for gradually decreasing the second duty. If the condition for switching to the fourth mode is satisfied (Yes in step S34), the control unit 12 switches to the fourth mode of the third control (step S35). The fourth mode of the third control is a mode for decreasing the first duty while fixing the second duty. The first duty and the second duty are each identical before and after the switching from the first mode to the second mode.

After switching to the fourth mode in step S35, the control unit 12 determines whether a condition for switching to the first control is satisfied (step S36). The condition for switching to the first control may be that "the first duty has become the step-down switching threshold or less", "the voltage conversion ratio has become identical to the voltage conversion ratio at which the first duty is equal to the upper limit threshold and the second duty is 0%", or "the time elapsed since switching to the fourth mode has reached a predetermined time", for example.

If the condition for switching to the first control is not satisfied (No in step S36), the control unit 12 returns to step S36. That is, the control unit 12 repeats the determination of whether the condition for switching to the first control is satisfied while continuing the fourth mode of the third control. If the condition for switching to the first control is satisfied (Yes in step S36), the control unit 12 switches to the first control (step S37). At the time of switching from the third control to the first control, the control unit 12 adjusts the first duty and the second duty such that the voltage conversion ratio is identical before and after the switching. As an adjustment method, first, the current voltage conversion ratio is calculated in accordance with Equation 1, for example. Then, D1 is determined by substituting the current voltage conversion ratio for TR and substituting 0(%) for D2. Accordingly, the first duty immediately after the switching is determined. As another adjustment method, the control unit 12 may determine in advance the post-switching first duty and second duty, and switch to the first control at the timing when the current voltage conversion ratio becomes identical to the post-switching voltage conversion ratio in the third control. After switching to the first control, the control unit 12 gradually decreases the first duty such that the output voltage of the voltage conversion unit 6 becomes the target voltage value while maintaining the second duty at 0%.

Figure 5:
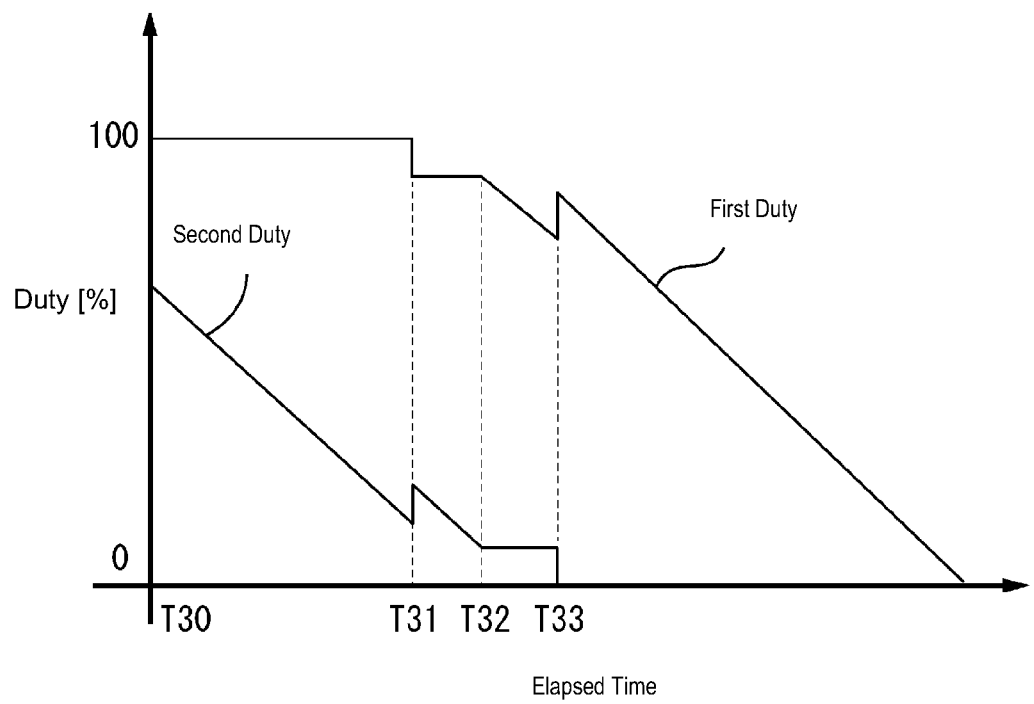
FIG. 5 is a graph showing temporal changes in the first duty and the second duty at the time of transition from the second control to the first control.

Next, temporal changes in the duties at the time of transition from the second control to the first control will be described. In the example shown in FIG. 5, the control unit 12 performs the second control in the stage before timing T30. At timing T30, the control unit 12 starts the decrease control in response to the satisfaction of the condition for transition to the first control. As a result, the second duty gradually decreases, and the output voltage from the voltage conversion unit 6 gradually decreases. After that, at timing T31, the second duty reaches the lower limit threshold. Thus, the control unit 12 switches from the second control to the third control such that the voltage conversion ratio is identical before and after the switching. As a result, the first duty becomes lower than that immediately before the switching, and the second duty becomes higher than that immediately before the switching. At timing T31, the control unit 12 switches from the second control to the third mode of the third control. Thus, the second duty alone gradually decreases while the first duty is fixed. After that, at timing T32, when the condition for switching to the fourth mode is satisfied, the control unit 12 switches to the fourth mode. As a result, the first duty gradually decreases while the second duty is fixed. Further, at timing T33, if the condition for switching to the first control is satisfied, the control unit 12 switches from the third control to the first control such that the voltage conversion ratio is identical before and after the switching. At the time of switching, the first duty reaches the upper limit threshold, and the second duty becomes 0%, for example. After that, the first duty gradually decreases while the second duty is fixed at 0%.

Next, advantageous effects of the present configuration will be described. The in-vehicle power supply device 1 in the present disclosure includes the voltage conversion unit 6 and the control unit 12. The control unit 12 performs the first control to cause the voltage conversion unit 6 to perform only the step-down operation, the second control to cause the voltage conversion unit 6 to perform only the step-up operation, and the third control to cause the voltage conversion unit 6 to perform both the step-down operation and the step-up operation. If the first duty becomes the upper limit threshold or greater in the first control, the control unit 12 performs the third control. If the second duty becomes the lower limit threshold or less in the second control, the control unit 12 performs the third control. According to this configuration, in the first control, it is possible to perform only the step-down operation until the first duty becomes the upper limit threshold or greater, thus suppressing power consumption. If the first duty becomes the upper limit threshold or greater, the third control can be performed to realize voltage conversion that would be difficult by only performing the step-down operation. The "voltage conversion that would be difficult by only performing the step-down operation" refers to voltage conversion that would be difficult by only performing the step-down operation among types of voltage conversion having a voltage conversion ratio lower than 1, and specifically, refers to voltage conversion in which the first duty exceeds the upper limit value. In the second control, it is possible to perform only the step-up operation until the second duty becomes the lower limit threshold or less, thus suppressing power consumption. If the second duty becomes the lower limit threshold or less, the third control can be performed to realize voltage conversion that would be difficult by only performing the step-up operation. The "voltage conversion that would be difficult by only performing the step-up operation" refers to a voltage conversion that would be difficult by only performing the step-up operation among types of voltage conversion having a voltage conversion ratio higher than 1, and specifically, refers to voltage conversion in which the second duty exceeds the lower limit value. According to this configuration, it is possible to suppress the occurrence of a situation in which appropriate voltage conversion cannot be performed even in the case of conversion to an output voltage closer to an input voltage.

At the time of transition from the first control to the second control, the control unit 12 further performs the increase control to gradually increase the first duty in the first control. Then, if the first duty reaches the upper limit threshold in the increase control, the control unit 12 switches to the third control, and then performs the second control after the third control. According to this configuration, it is possible to suppress the occurrence of a situation in which appropriate voltage conversion cannot be performed in the course of transition from the step-down operation to the step-up operation.

At the time of transition from the second control to the first control, the control unit 12 further performs the decrease control to gradually decrease the second duty in the second control. Then, if the second duty reaches the lower limit threshold in the decrease control, the control unit 12 switches to the third control, and then performs the first control after the third control. According to this configuration, it is possible to suppress the occurrence of a situation in which appropriate voltage conversion cannot be performed in the course of transition from the step-up operation to the step-down operation.

At the time of switching from the first control or the second control to the third control, the control unit 12 adjusts the first duty and the second duty such that the voltage conversion ratio becomes identical before and after the switching. According to this configuration, it is possible to suppress a large change in the output voltage when switching from the first control or the second control to the third control.

Other Embodiments

The present disclosure is not limited to the embodiments described above and illustrated in the drawings. For example, features of the embodiments described above or below can be combined as desired without contradiction. Any of the features of the embodiments described above or below can be omitted unless they are explicitly specified as essential. The embodiments described above may be modified as described below.

In the first embodiment, the control unit is configured to perform the third control in both the case where "the first duty has become the upper limit threshold or greater in the first control" and the case where "the second duty has become the lower limit threshold or less in the second control". Alternatively, the control unit may perform the third control in only either one of the cases.

In the first embodiment, the control unit is constituted mainly by a microcomputer. Alternatively, the control unit may be implemented by a plurality of hardware circuits other than a microcomputer.

It should be noted that the embodiments disclosed herein are examples in all respects and are not limitative. The present disclosure is not limited to the examples herein, but rather is indicated by the scope of claims, and is intended to include all modifications within a meaning and scope equivalent to the scope of claims.

The invention claimed is:

1. An in-vehicle power supply device comprising:
a voltage conversion unit configured to perform voltage conversion between a first conducting path and a second conducting path; and
a control unit configured to control the voltage conversion unit, wherein
the voltage conversion unit has a first switching element and a second switching element, and performs a step-down operation of turning on and off the first switching element to decrease a voltage applied to the first conducting path and applying the voltage to the second conducting path, and a step-up operation of turning on and off the second switching element to increase a voltage applied to the first conducting path and applying the voltage to the second conducting path,
the control unit performs a first control to cause the voltage conversion unit to perform the step-down operation and not perform the step-up operation, a second control to cause the voltage conversion unit to perform the step-up operation and not perform the step-down operation, and a third control to cause the voltage conversion unit to perform both the step-down operation and the step-up operation, and
the control unit performs the third control in a case where a first duty of an on-off signal provided to the first switching element becomes an upper limit threshold or greater in the first control, wherein the upper limit threshold is a value that is set for controlling an on and off state of the first switching element, and in a case where a second duty of an on-off signal provided to the second switching element becomes a lower limit threshold or less in the second control, wherein the lower limit threshold is a value obtained by subtracting the upper limit value from 100%.

2. The in-vehicle power supply device according to claim 1, wherein the control unit performs increase control to gradually increase the first duty in the first control at a transition from the first control to the second control, and, when the first duty reaches the upper limit threshold in the increase control, the control unit switches to the third control, and then performs the second control after the third control.

3. The in-vehicle power supply device according to claim 1, wherein the control unit performs decrease control to gradually decrease the second duty at transition from the second control to the first control, and, when the second duty reaches the lower limit threshold in the decrease control, the control unit switches to the third control, and then performs the first control after the third control.

4. The in-vehicle power supply device according to claim 1, wherein at switching from the first control or the second control to the third control, the control unit adjusts the first duty and the second duty such that a voltage conversion rate is identical before and after the switching.

* * * * *